United States Patent
Georgiev et al.

[11] 3,768,326
[45] Oct. 30, 1973

[54] ORTHOGONAL SKEW-AXIS GEARING

[76] Inventors: Anatoly Konstantinovich Georgiev, ulitsa 9 Podlesnaya, 54, kv. 12; Veniamin Iosifovich Goldfarb, pereulok Shkolny, 60, kv. 53, both of Izhevsk, U.S.S.R.

[22] Filed: Dec. 16, 1971

[21] Appl. No.: 208,838

[52] U.S. Cl. ................. 74/425, 74/458, 74/459.5
[51] Int. Cl. ................... F16h 1/16, F16h 55/04
[58] Field of Search ............ 74/459.5, 425, 462, 74/458, 457

[56] References Cited
UNITED STATES PATENTS

| | | | |
|---|---|---|---|
| 3,645,148 | 2/1972 | Schrempp | 74/425 X |
| 2,752,751 | 7/1956 | Vaucher | 74/462 X |
| 1,136,069 | 4/1915 | Weaver | 74/459.5 |

*Primary Examiner*—Leonard H. Gerin
*Attorney*—Eric H. Waters et al.

[57] ABSTRACT

A skew-axis gearing which consists of a cylindrical worm and a flat worm wheel, which interengage beyond a plane passing through the wheel axis, normal to the worm axis. To achieve elevated load capacity of this gearing in its action by either side of the worm threads, the profile of the latter is made curved.

3 Claims, 3 Drawing Figures

ORTHOGONAL SKEW-AXIS GEARING

The present invention relates to toothed gearings, and more specifically to orthogonal skew axis gearings.

The present invention can be utilized in machine-tools, motor cars, instruments and other technical fields, primarily there, where large loads are to be transmitted within possibly small dimensions, particularly if low susceptibility of the gearing to assembly errors and its high operating smoothness are also desired.

Known in the art are orthogonal skew axis gearings, comprising a cylindrical worm pinion of constant lead and a worm wheel made as a flat ring with teeth formed on its face. In these gearings, said worm and worm wheel are disposed so, that the space within which they engage each other (the zone of their engagement) is located aside of the plane passing through the axis of the worm wheel normally to the worm axis, and the profile of the side faces of the worm coils has a straight-line shape (see, for example, British Pat. No. 940501, cl. F,2Q, published 1963).

The following disadvantages are inherent in these gearings.

To secure maximum contact strength, and therefore to provide close-to-optimum values of the radii of curvature, of the worm coil or thread side surfaces facing the common interaxial perpendicular of the gearing (i.e., of the so-called "front" faces of the worm), as well as of the wheel teeth faces meshing therewith, quite a small value of the profile angle of said "front" faces of the worm should be assumed. But with a straight-lined profile this turns out to be undesirable, first, due to the increased stress concentration at the base of the worm coils caused by the fact, that the transition from their side faces to the dedendum surface in this case becomes sharper, and second, because of the excess thinning, and hence, weakening, of the worm coil roots. All this involves reduced bending strength of the latter. That is why providing a close-to-optimum load capacity for load transmission by the "front" faces of the worm and the corresponding wheel teeth faces turns out to be difficult with such gearings.

Besides that, to exclude undercuts and minimize the transition areas on those side faces of the wheel teeth which engage the worm faces opposite to its "front" faces (i.e., the so-called "rear" faces of the worm), quite a large value of the profile angle of said "rear" faces of the worm has to be assumed in these gearings. But large values of this profile angle also involve large thrust forces tending to buckle the worm and the wheel, correct engagement thus being ultimately disturbed. What is more, increased values of the profile angle of said "rear" faces of the worm entail lower values of the reduced radii of curvature of the engaging faces of the worm and the wheel teeth, which tends to lessen their contact strength and the carrying capacity of the oil film therebetween.

This is why providing a close-to-optimum load capacity for load transmission by the "rear" faces of the worm and the corresponding faces of the wheel teeth is again difficult in such gearings.

It is an object of the present invention to eliminate the cited disadvantages.

An important object of the invention is to extend the load capacity of the gearing in working by either side of the worm coils or threads.

Another object of the invention is to increase the contact and the bending strength in working by the "front" faces of the worm.

One more object of the invention is to reduce the thrust forces acting in the gearing, and to raise the carrying capacity of the oil film between the "rear" face of the worm and the wheel tooth face engaging it, the same undercutting expectancy of the latter being maintained.

It is also an object of the invention to ensure more complete adhesion of the worm faces to the wheel teeth faces engaging them.

With these and other objects in view, in an orthogonal skew axis gearing, comprising a worm wheel made as a flat ring with teeth formed on its face, and a cylindrical pinion worm meshing therewith and disposed beyond the plane passing through the wheel axis normal to the worm axis, according to the invention, the profile of the side faces of the worm coils is made curved, the sides facing the common interaxial perpendicular of the gearing having a concave profile, and the opposite sides having a convex profile.

Since the profile of the worm side faces is curved, angles $\alpha$ between tangents to the profile in its points spaced varying distances from the worm axis, and the plane perpendicular to this axis turn out to be different, whereas in the conventional gearing said angles $\alpha$ in said points remain unchanged due to the straight-lined profile of the worm coils.

When angles $\alpha_1$ in those profile points of the "front" face which lie on the median cylinder of the worm, are for the conventional and the proposed gearings equal, their angles $\alpha_2$ in the profile points lying on the addendum cylinder of the worm are found to be unequal. And whereas in the conventional gearing $\alpha_1=\alpha_2$, in the proposed gearing the concavity of the "front" face results in that angle $\alpha_2$ is quite small, less than said angle $\alpha_1$. Since a reduced angle $\alpha_2$ helps to increase contact strength, the concave profile of the "front" face is optimal from this standpoint.

Besides that, the concave shape of the "front" face of the worm coil helps, first, to reduce stress concentrations at the coil base due to the transition from the concave "front" face to the dedendum surface being now smoother, and second, to extend the thickness of the coil root, thus raising its bending strength.

Hence, making the "front" face of the coil concave increases the load capacity of the gearing when working with this face.

With equal angles $\alpha_3$ in those points of the "rear" face profile, which lie on the median cylinder of the worm, in the conventional and the proposed gearings, and with accordingly equal values of thrust forces acting in the gearing and determined by these angles, angles $\alpha_4$ in the profile points lying on the addendum cylinder of the worm are unequal for the two gearings. And whereas in the conventional gearing $\alpha_3=\alpha_4$, in the proposed gearing the convexity of the "rear" face results in that angle $\alpha_4$ is found to be more, than said angle $\alpha_3$. Since, from the undercutting conditions, it is just in the most distant point from the worm axis, that a larger angle is necessary, the convex profile of the "rear" face is optimal from the standpoint of said condition.

On the other hand, with equal angles $\alpha_4$ and hence, equal expectancies of undercutting the wheel teeth faces engaging the "rear" faces of the worm coils, in the conventional and the proposed gearings, angle $\alpha_3$ in the latter is less than angle $\alpha_4$, owing to the convexity of the "rear" face. This helps, first, to reduce the thrust forces acting in the gearing, and second, to raise the carrying capacity of the oil film enclosed between the convex "rear" face of the worm coil and the wheel tooth face interacting therewith, and thus to increase the load capacity of the gearing when working by this side of the coil.

As we have disclosed from an analysis of the engagement conditions in the proposed gearing, for a more effective increase of the load capacity of the gearing acting by the concave "front" face of the worm, the above-said angles $\alpha_1$ and $\alpha_2$ should advantageously be chosen within 5°–20° and 0°–10°, respectively, and it is expedient, that the centre $C_1$ of curvature of the concave profile of the "front" face in the point of its intersection with the median cylinder of the worm be located outside this cylinder, and the radius $\phi_1$ of curvature of this profile in said point equal 0.5–2 diameters $d_1$ of the median cylinder of the worm.

As to the convex "rear" face, to achieve a more effective increase of the load capacity of the gearing when acting by this side of the worm, the aforesaid angles $\alpha_3$ and $\alpha_4$ should advisably be chosen within 20°–35° and 30°–50°, respectively, and it is expedient that the centre $C_2$ of curvature of the convex profile in the point of its intersection with the median cylinder of the worm be located inside this cylinder, and radius $\phi_2$ of curvature of said profile in said point equal 0.5–1.5 diameters $d_1$ of the median cylinder of the worm.

For a better understanding of the invention following is a description of a particular exemplary embodiment thereof with references to the appended drawings, wherein.

Figure 1:
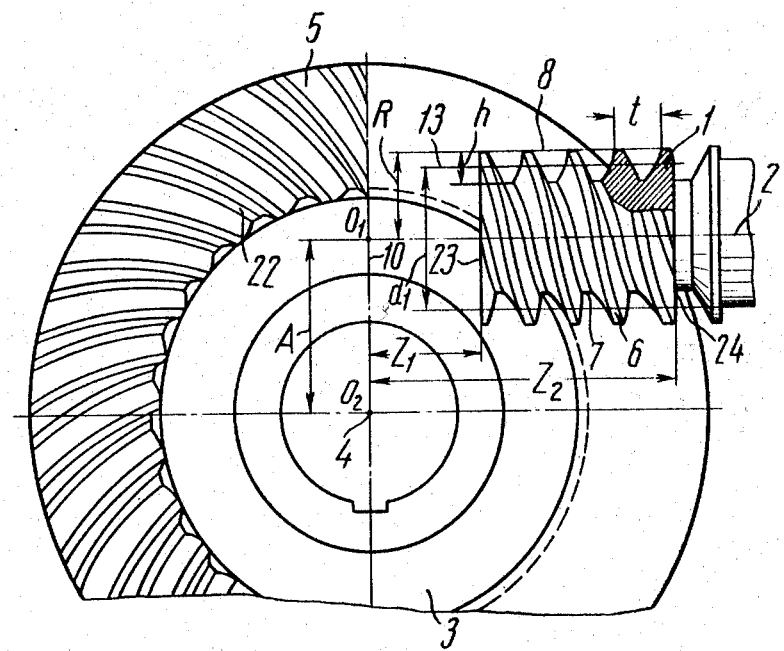
FIG. 1 shows the proposed gearing as viewed in the direction of the worm wheel axis.

The gearing consists of a cylindrical worm 1 (FIG. 1) having an axis 2, and a worm wheel 3 with an axis 4 having the form of a flat ring with a toothed rim 5. Coils or threads 6 of worm 1 have a constant height h all across the worm length, which means that assumed as the dedendum surface of coils 6 is a cylinder 7 equidistant from their addendum cylinder 8.

Worm 1 and wheel 3 are disposed so, that they engage each other beyond the plane passing through axis 4 of wheel 3, which is normal to axis 2 of worm 1.

Figure 2:
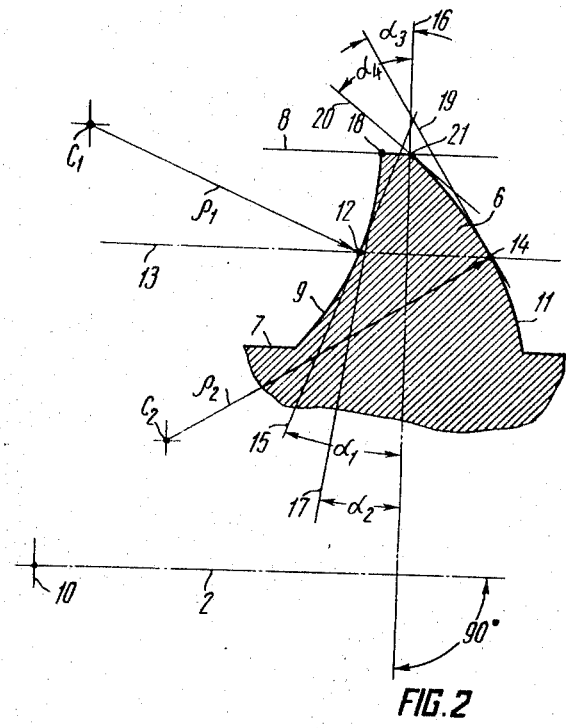
FIG. 2 is a section through a worm coil of the gearing shown in FIG. 1, enlarged view.

Side faces 9 (FIG. 2) of coils 6 facing a common interaxial perpendicular 10 of the gearing (the so-called "front" faces) have a concave profile, and opposite side faces 11 (the so-called "rear" faces) have a convex profile.

The profile curves of coils 6 are smooth curves of any type, for example, circular or elliptical arcs, sections of parabolas or sinusoids, etc.

The centre $C_1$ of curvature of the profile of the "front" face 9 in point 12 of its intersection with the generatrix of a median cylinder 13 of coils 6 of worm 1 is always located outside said cylinder 13, and the centre $C_3$ of curvature of the profile of the "rear" face 11 in point 14 of its intersection with the generatrix of the median cylinder 13 of coils 6 of worm 1 is always located inside said cylinder 13.

A tangent 15 to the profile of the "front" face 9 of the coil in point 12 forms with a plane 16 perpendicular to axis 2 of worm 1 an angle $\alpha_1$ whose value varies within 5° to 20°, and a tangent 17 to the profile of the "front" face 9 in point 18 of its intersection with the addendum cylinder 8 of coils 6 forms with plane 16 an angle $\alpha_2$ whose value varies between 0° and 10°. Radius $\phi_1$ of curvature of the profile of the "front" face 9 in point 12 equals 0.5–2.0 diameters $d_1$ (FIG. 1) of the median cylinder 13 of worm 1. The concave shape of the profile of the "front" face 9 of coils 6, and the assumed ranges of values of angles $\alpha_1$, $\alpha_2$ and radius $\phi_1$ provided for an elevated contact and bending strength of coils 6, and hence, for an elevated load capacity of the gearing in working with this side of the coil.

A tangent 19 (FIG. 2) to the profile of the "rear" face 11 of the coils in point 14 forms with the plane 16 perpendicular to axis 2 of worm 1 an angle $\alpha_3$ whose value varies between 20° and 35°, while a tangent 20 to the profile of the "rear" face 11 in point 21 of its intersection with the addendum cylinder 8 of coils 6 forms with plane 16 an angle $\alpha_4$ the value of which varies within 30° to 50°. The radius $\phi_2$ of curvature of the profile of the "rear" face 11 in point 14 equals 0.5–1.5 diameters $d_1$ (FIG. 1) of the median cylinder 13 of worm 1. The convex shape of the profile of the "rear" face 11 of coils 6, and the assumed ranges of values of angles $\alpha_3$, $\alpha_4$ and of radius $\phi_2$ provide for an elevated load capacity of the gearing when working with this side of the coil.

For a more complete adhesion of the side faces of coils 6 of worm 1 to the mating faces of teeth 22 of wheel 3, the axial lead $t$ of coils 6 should be calculated by formula $$t = \frac{2\pi A}{n\left(i - \frac{Z_1 + Z_2}{2R}\right)}, \text{ in mm.,}$$

where

A is the centre distance, i.e., the distance between points $O_1$ and $O_2$ of intersection of the common interaxial perpendicular 10 respectively with axis 2 of worm 1 and axis 4 of the worm wheel 3, in mm;

n - number of threads of worm 1;

i - ratio of the number of teeth 22 of the worm wheel 3 to the number of threads n of worm 1, i.e. the reduction ratio of the gearing;

$Z_1, Z_2$ - distances between the plane passing through the common interaxial perpendicular 10 normally to axis 2 of worm 1, and respectively the near end face 23 and the far end face 24 of the meshing part of the worm, in mm;

R - radius of the addendum cylinder 8 of coils 6 of worm 1, in mm.

The parameters of tooth 22 in the toothed rim 5 of wheel 3 are determined by the parameters of worm 1 and of the gearing as a whole. The gearing can be realized for reduction ratios of from 3 up to 450.

Figure 3:
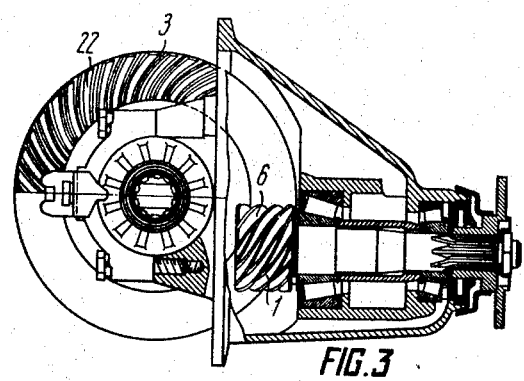
FIG. 3 shows a speed reducer wherein the proposed gearing is employed.

FIG. 3 shows an example of a particular use of the proposed gearing, namely a rear-axle speed reducer of a passenger car, wherein the above-described gearing is employed as the axle drive. The use of this gearing in said reducer permits increasing the longevity and reliability of the latter.

What we claim is:

1. An orthogonal non-intersecting axis gearing, comprising a flat toothed wheel and a cylindrical threaded worm the latter being displaced along its axis from the axial plane of said wheel, which plane is perpendicular to said axis, the teeth of said wheel mating with the turns of the threads of said worm, the side faces of said thread turns facing the axis of said wheel and having in the normal section a concave side profile, the other side faces of said thread turns having in the normal section a convex side profile, said thread turns having a constant axial pitch determined in accordance with the formula $$L = \frac{2\pi A}{i - \frac{Z_1 + Z_2}{2R}}$$

wherein

A represents the distance between said worm axis and said wheel axis measured along a common perpendicular to these axes;

$i$ selectively represents the reduction ratio of the gearing, and the ratio of a preset number of teeth of said wheel to that of said threads;

$Z_1$ and $Z_2$ represent respective distances between said axial plane of the wheel and other planes which are perpendicular to said worm axis; and R represents the radius of the addendum cylinder of said thread turns.

2. The gearing as defined in claim 1, wherein the tangent to said concave profile forms an angle within 5° and 20° with a plane which is perpendicular to said worm axis, at the points of intersection of said concave profile with the mid-cylinder of said worm; the tangent to said concave profile forms an angle within 0° and 10° with said perpendicular plane, at the points of intersection of said concave profile with the outer cylinder of said worm; the center of curvature of said concave profile is disposed beyond said mid-cylinder at said points of intersection with the same; and the radius of curvature of said concave profile is within $0.5d_1$ and $2d_1$ at the same points of intersection, wherein $d_1$ is the diameter of said mid-cylinder.

3. The gearing as defined in claim 1, wherein the tangent to said convex profile forms an angle within 20° and 35° with a plane which is perpendicular to said worm axis, at the points of intersection of said convex profile with the mid-cylinder of said worm; the tangent to said convex profile forms an angle within 30° and 50° with said perpendicular plane, at the points of intersection of said convex profile with the outer cylinder of said worm; the center of curvature of said convex profile is disposed inside said mid-cylinder at said points of inter-section with the same; and the radius of curvature of said convex profile is within $0.5d_1$ and $1.5d_1$ at the same point of the intersection, wherein $d_1$ is the diameter of said mid-cylinder.

* * * * *